US011046173B2

(12) United States Patent
Spurling et al.

(10) Patent No.: US 11,046,173 B2
(45) Date of Patent: Jun. 29, 2021

(54) SYSTEMS FOR A FUEL LINE ATTACHMENT ASSEMBLY (71) Applicant: Ford Global Technologies, LLC, Dearborn, MI (US)

(72) Inventors: Michael Spurling, Romford (GB); Luis Pinheiro, Maia (PT); Frank Kotthoff, Erpel (DE); Scott Holmes, Leigh On Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 16/403,416

(22) Filed: May 3, 2019

(65) Prior Publication Data

US 2019/0337378 A1   Nov. 7, 2019

(30) Foreign Application Priority Data

May 4, 2018 (GB) ...................................... 1807347

(51) Int. Cl.
| F16L 13/00 | (2006.01) |
| B60K 15/01 | (2006.01) |
| F16L 35/00 | (2006.01) |
| F02M 37/00 | (2006.01) |
| B60K 5/12  | (2006.01) |

(52) U.S. Cl.
CPC ............ B60K 15/01 (2013.01); B60K 5/1275 (2013.01); F02M 37/0017 (2013.01); F16L 35/00 (2013.01)

(58) Field of Classification Search
CPC ........ B60K 15/01; B60K 5/1275; B60K 5/12; F02M 37/0017

USPC ................... 248/65, 73, 74.4, 548; 180/232; 123/195 C
See application file for complete search history.

(56) References Cited

U.S. PATENT DOCUMENTS

| 7,063,074 B2 * | 6/2006 | Horibe ............. F02M 35/10111 |
|  |  | 123/469 |
| 10,294,904 B2 * | 5/2019 | Tanaka ................... F02M 61/14 |
| 10,562,386 B2 * | 2/2020 | Spurling ............. B62D 25/082 |
| 2004/0159302 A1 | 8/2004 | Horibe et al. |
| 2007/0012501 A1 | 1/2007 | Frank et al. |
| 2009/0107450 A1 | 4/2009 | Olsen et al. |
| 2011/0084476 A1 | 4/2011 | Nishida |
| 2013/0112817 A1 | 5/2013 | Unger |
| 2015/0101696 A1 | 4/2015 | Ishiki et al. |

(Continued)

FOREIGN PATENT DOCUMENTS

| DE | 202004019821 U1 | 4/2006 |
| DE | 102010061441 A1 | 6/2012 |

(Continued)

OTHER PUBLICATIONS

Great Britain Intellectual Property Office, Combined Search and Examination Report under Sections 17 and 18(3) Issued in Application No. GB1807347.8, dated Oct. 30, 2018, 10 pages.

*Primary Examiner* — Todd M Epps
(74) *Attorney, Agent, or Firm* — Geoffrey Brumbaugh; McCoy Russell LLP (57) ABSTRACT Methods and systems are provided for a fuel line attachment. In one example, a system comprises a fuel line attachment assembly comprising a fixed portion and a movable portion, wherein the movable portion is shaped to slide along a recess of the fixed portion in response to a vehicle collision.

20 Claims, 4 Drawing Sheets (56) References Cited

U.S. PATENT DOCUMENTS

2016/0230655 A1    8/2016   Dominic
2017/0259694 A1    9/2017   Fukuda et al.
2017/0306909 A1   10/2017   Tanaka et al.

FOREIGN PATENT DOCUMENTS

| | | |
|---|---|---|
| DE | 102012013101 A1 | 1/2014 |
| EP | 2397356 A1 | 12/2011 |
| FR | 2703752 A1 | 10/1994 |
| JP | H04127017 U | 11/1992 |
| JP | H11324842 A | 11/1999 |
| JP | 2004360381 A | 12/2004 |
| JP | 2011185228 A | 9/2011 |
| KR | 20090059914 A | 6/2009 |
| WO | 2008062045 A1 | 5/2008 |

* cited by examiner

SYSTEMS FOR A FUEL LINE ATTACHMENT ASSEMBLY

CROSS REFERENCE TO RELATED APPLICATION

The present application claims priority to United Kingdom patent application No. 1807347.8, filed on May 4, 2018. The entire contents of the above-listed application are hereby incorporated by reference for all purposes.

FIELD

The present description relates generally to a fuel line attachment assembly configured to mitigate damage to a fuel line during a vehicle collision.

BACKGROUND/SUMMARY

Fuel lines for vehicles, (e.g. motor vehicles), may be routed from a fuel tank to an engine of the vehicle through an engine compartment. The fuel lines may be coupled to a frame of the vehicle at one or more locations along the length of the fuel lines to block the fuel lines from moving, (e.g. vibrating or oscillating), during normal use of the motor vehicle.

In the event of a collision of the motor vehicle, it is desirable to mitigate degradation to the fuel lines. However, due to tight packaging constraints within the engine compartment the fuel lines are often routed between or adjacent to other components of the motor vehicle that can become displaced during the collision. For example, it may be difficult to block the fuel lines from being impacted by the other components, if the other components become displaced or dislodged.

In one example, the issues described above may be addressed by a system comprising a fuel line attachment assembly comprising a fixed portion fixedly coupled to a frame of a vehicle, further comprising a movable portion coupled to the fixed portion via a stop element, the movable portion slides along a recess of the fixed portion in response to a threshold force applied to the stop element. In this way, the fuel line may be more decoupled from the vehicle frame in response to the threshold force, which may be generated during a vehicle impact. It should be appreciated that there are various competing interests in mitigating damage during impacts and in some cases it may not be advantageous to provide such a configuration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1 through 5 are shown to scale, however, other relative dimensions may be used without departing from the scope of the present disclosure.

DETAILED DESCRIPTION

Figure 2:
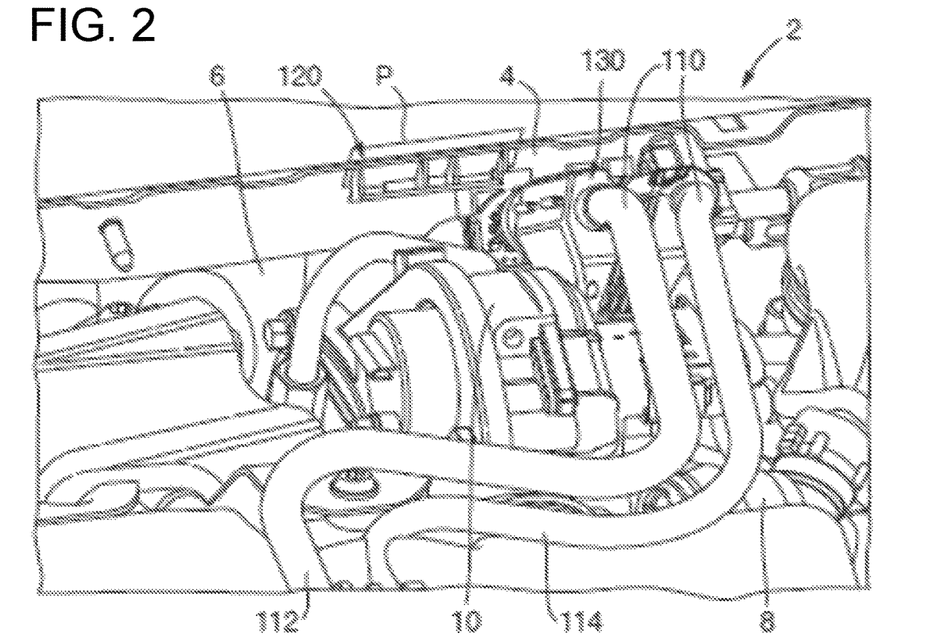
FIG. 2 is a front perspective view of the vehicle assembly following a collision.
Figure 3A:
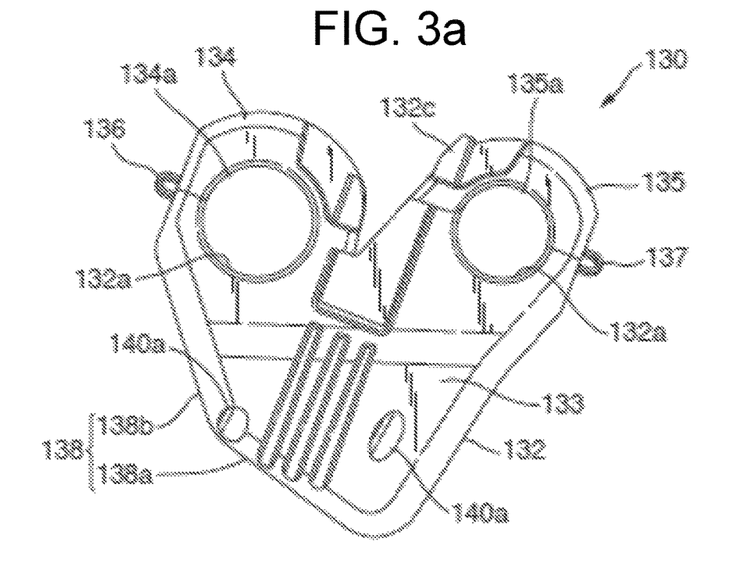
FIGS. 3a, 3b and 3c, are front, top, and bottom perspective views of an impact structure according to arrangements of the present disclosure.
Figure 3B:
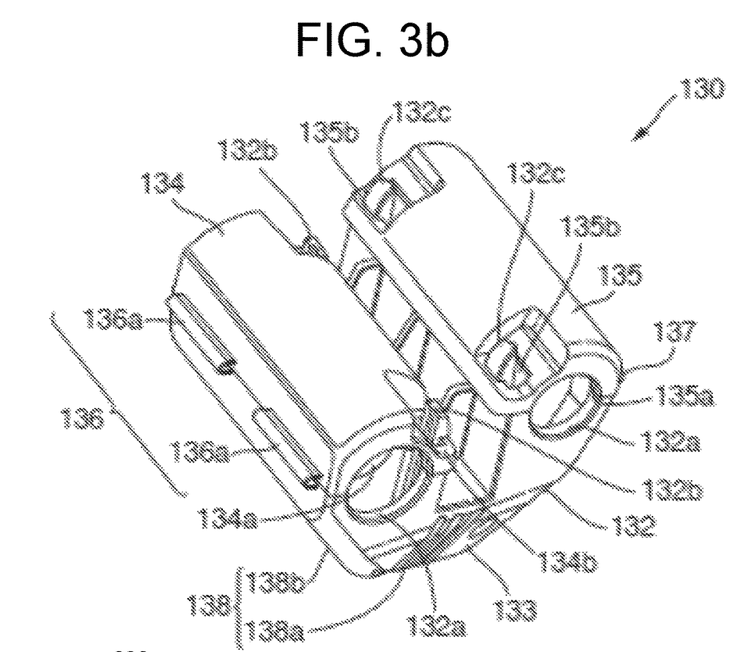
Figure 3C:
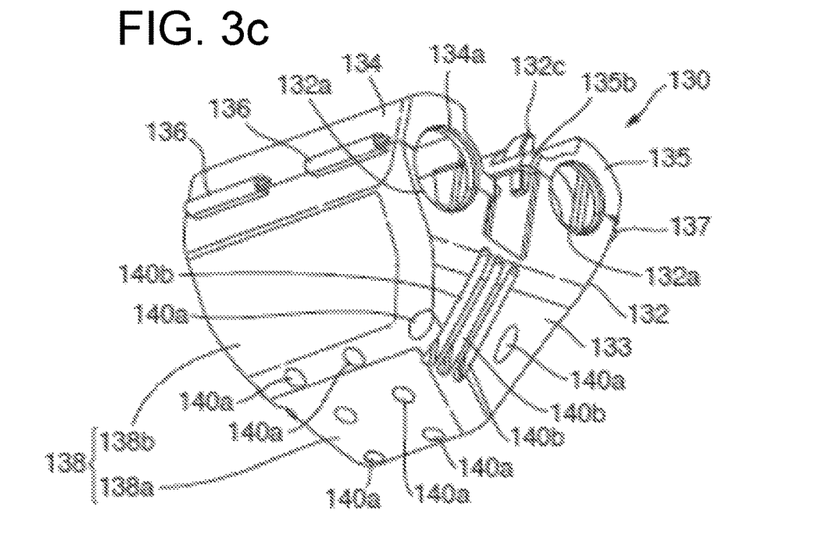

The following description relates to systems and methods for a fuel line attachment assembly for a motor vehicle. The fuel line attachment assembly comprises a fuel line coupler for coupling a fuel line to a frame of the vehicle in an attachment plane. The fuel line attachment assembly is illustrated prior to a collision in FIG. 1 and following a collision in FIG. 2. The fuel line attachment assembly further comprises an impact structure, wherein the impact structure comprises an impact face, the impact face being angled relative to the attachment plane, such that an impact on the impact face, (e.g. during a collision of the vehicle), acts to displace the fuel line in a direction with a component parallel to the attachment plane and/or a component away from the vehicle frame. The impact structure and its faces are shown in FIGS. 3a, 3b, and 3c.

The impact structure may comprise two or more impact faces. The impact faces may be angled relative to one another. The impact faces may be angled such that the overall impact force on the impact faces is in a desired direction, (e.g. the direction with a component parallel to the attachment plane and/or a component away from the vehicle frame).

The impact face or faces may be provided on an opposite side of the fuel line relative to the attachment plane.

The attachment plane may be a plane parallel to the vehicle frame and/or the fuel line coupler at the position at which the fuel line coupler is coupled to the vehicle frame. Additionally or alternatively, the attachment plane may be a plane including one or more attachment points at which the fuel line coupler is coupled to the vehicle frame.

The fuel line coupler and the impact structure may be coupled to a fuel line. The fuel line coupler and the impact structure may be spaced apart from one another along the fuel line. Alternatively, the fuel line coupler may be coupled to or integrally formed with the impact structure.

The impact structure may comprise a housing configured to house at least a portion of the fuel line within the impact structure. The impact structure may comprise a shell structure having one or more stiffening features, such as ribs, webs, and/or swages, arranged to stiffen the impact face, (e.g. to resist deformation of the impact structure under impacts applied to the impact face).

The impact structure may comprise a first portion and a second portion, (e.g. first and second housing parts). The first and second portions may be configured to couple together about the fuel line to couple the impact structure to the fuel line. In this way, the portion of the fuel line may be housed between the first and second portions. The first and second portions may define recesses for receiving the fuel line between the first and second portions. That is to say, each of the first and second portions may comprise a recess such that the fuel line may be arranged between the first and second portions in the space of the recesses.

The first and second portions of the impact structure may be coupled together by a living hinge. The impact structure may be a one-piece component. For example, the impact structure may be a one-piece mold. In one example, the impact structure is an injection molded component comprising a plastic material.

The fuel line coupler may be configured to decouple the fuel line from the vehicle frame by virtue of the displacement of the fuel line in the direction with a component parallel to the attachment plane.

The fuel line coupler may be configured to facilitate displacement of the fuel line in the direction with a component parallel to the attachment plane. For example, the fuel line coupler may comprise a fixed part configured to be fixedly coupled to the vehicle frame, and a movable part configured to couple to a fuel line and movably couple to the fixed part. The movable part may be movable relative to the fixed part in the direction with a component parallel to the connection plane, (e.g. in order to decouple the fuel line from the vehicle frame). The movable part may be slidably coupled to the fixed part.

A portion of the fixed part and the movable part may comprise a recess configured to slidably receive a portion of the other of the fixed part and the movable part.

The fuel line coupler may comprise a stop element configured to resist displacement of the fuel lines in the direction parallel to the attachment plane until a threshold displacement force is applied, (e.g. to the fuel line attachment assembly), acting to displace the fuel lines, (e.g. in the direction parallel with the attachment plane). The stop element may be arranged to resist movement of the movable part relative to the fixed part.

According to another aspect of the present disclosure there is provided a fuel line coupler for coupling a fuel line to a frame of a motor vehicle, wherein the fuel line coupler comprises a fixed part configured to fixedly couple to the vehicle frame in an attachment plane and a movable part configured to couple to the fuel line and movably couple to the fixed part, such that the movable part is movable relative to the fixed part in a direction parallel with the attachment plane. In one example, the movable part is configured to slidably couple to the fixed part.

For example, one of the fixed part and the movable part may comprise a recess configured to slidably receive a portion of the other of the fixed part and the movable part. The recess may shape a track, along which the movable portion may slide during a vehicle collision. A stop element may block the movable portion from sliding during normal vehicles conditions. Normal vehicle conditions are herein defined as vehicles conditions outside of a vehicle collision.

The fuel line coupler may be configured to decouple the fuel line from the vehicle frame via the movement of the fuel line in the direction with a component parallel to the connection plane. For example, the portion of the other of the fixed part and the movable part may no longer be received within the recess following the movement of the fuel line.

The fuel line coupler may comprise a stop element configured to resist displacement of the fuel lines in the direction parallel to the attachment plane until a threshold displacement force is applied, (e.g. to the fuel line attachment assembly), acting to displace the fuel lines.

For example, the stop element may be arranged to resist movement of the movable part relative to the fixed part.

A motor vehicle may comprise the above-mentioned fuel line attachment assembly or the above mentioned fuel line coupler.

The direction with a component parallel with the attachment plane may be a substantially lateral direction of the motor vehicle. The fuel line attachments assembly and/or the fuel line coupler, may be arranged such that, in the event of a collision with a principle impact direction in a longitudinal direction of the motor vehicle, the fuel line assembly is displaced in a direction with a component perpendicular to the principle impact direction. That is to say, if the collision is a head on collision and a front of the vehicle is impacted, the fuel line assembly may be displaced in a direction perpendicular to an impact direction (e.g., a longitudinal direction of the vehicle), wherein the direction the fuel line assembly is displaced is parallel to a coupling plane corresponding to a plane at which the fuel line assembly is coupled to the vehicle frame. Additionally or alternatively, in some examples, the fuel line assembly may be displaced in a direction parallel to impact direction.

The motor vehicle may further comprise a vehicle component. The vehicle component may be displaceable in a direction towards the impact face during a collision of the motor vehicle. The impact face may be shaped to at least partially conform to a shape of the vehicle component, (e.g. a surface of the vehicle component facing the impact surface).

The impact structure may comprise two or more impact faces angled relative to one another. The two or more impact faces may be angled relative to one another in order to conform to the shape of the vehicle component.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
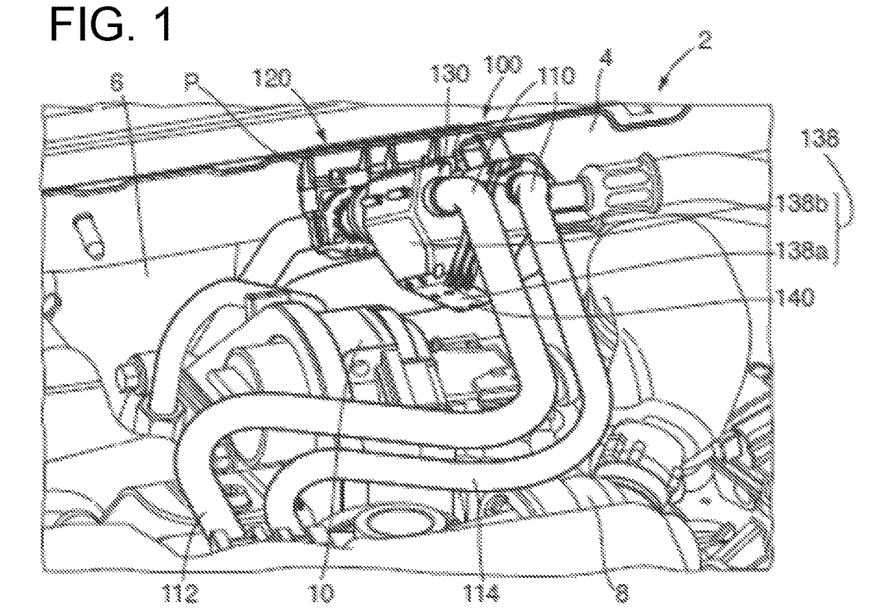
FIG. 1 is a front perspective view of a vehicle assembly according to arrangements of the present disclosure, prior to a collision.

Turning now to FIG. 1, it shows a vehicle assembly 2 of, for example, a motor vehicle, comprising a body frame structure 4, which defines an engine compartment 6, and an engine assembly 8 provided within the engine compartment 6.

The vehicle assembly 2 further comprises a displaceable component 10 provided within the engine compartment 6. As shown in FIG. 2, the displaceable component may become displaced, (e.g. relative to the body frame structure 4), in the event of collision of the vehicle.

In the arrangement shown in FIGS. 1 and 2, the displaceable component 10 is an actuator for a turbocharger assembly of the vehicle assembly 2. However, in other arrangements, the displaceable component 10 may be a different component of the engine assembly 8 or the vehicle assembly 2 that is positioned and supported within the engine compartment 6 such that the displaceable component 10 can become displaced during a collision of the vehicle.

An axis system 290 comprises three axes, namely an x-axis parallel to a horizontal direction, a y-axis parallel to a vertical direction, and a z-axis perpendicular to each of the x- and y-axes. In one example, the x-axis may be parallel to a longitudinal axis of the vehicle. Additionally or alternatively, the z-axis may be parallel to the longitudinal axis of the vehicle.

The vehicle assembly 2 further comprises a fuel line assembly 100. The fuel line assembly 100 comprises one or more fuel lines 110, such as a fuel feed line 112 and a fuel return line 114, configured to carry fuel between a fuel tank of the vehicle (not shown) and the engine assembly 8. The fuel feed line 112 and the fuel return line 114 may extend in a direction substantially perpendicular to the x-axis and parallel to the z-axis.

The fuel line assembly 100 further comprises a fuel line coupler 120, for coupling the fuel lines 110 to the body frame structure 4, in order to restrict movement of the fuel lines 110 during operation of the vehicle assembly 2 outside of a vehicle collision. In particular, the fuel line coupler 120 may restrict vibrations and/or oscillations of the fuel lines 110, which could otherwise lead to wear of the fuel lines 110.

The fuel line coupler 120 may be coupled to the body frame structure 4 using one or more fasteners, such as bolts, screws or rivets, or using a similar temporary fastening method. Alternatively, the fuel line coupler 120 may be coupled to the body frame structure 4 using a permanent fastening method, such as welding, brazing or by adhering the fuel line coupler 120 to the body frame structure 4.

The fuel line coupler 120 may be configured to couple to the body frame structure 4 in an attachment plane P of the fuel line assembly 100. The attachment plane P may be defined as a plane parallel with a surface of the fuel line coupler 120 and/or a surface of the body frame structure 4 at a point at which the fuel line coupler 120 is coupled to the body frame structure 4. For example, surfaces of the fuel line coupler 120 and body frame structure 4 that are adhered together may lie in the attachment plane P.

Additionally or alternatively, the attachment plane P may be defined as a plane including each of the points at which the fuel line coupler 120 is connected to the body frame structure 4, (e.g. locations at the axes of one or more fasteners provided for coupling together the fuel line coupler 120 and the body frame structure 4). In some examples, the attachment plane P is parallel to an x-y plane. In other examples, the attachment plane P is parallel to a y-z plane. In one example, the attachment plane P is angled relatively to each of the y-axis and the z-axis. A longitudinal direction of the vehicle may be substantially parallel to the z-axis in one example.

Packaging within the engine compartment 6 may be restricted, and hence, the position at which the fuel line coupler 120 is connected to the body frame structure 4 may be adjacent to the displaceable component 10, or between the displaceable component 10 and the body frame structure 4, as depicted in FIGS. 1 and 2.

In order to protect the fuel line assembly 100 from being damaged, (e.g. crushed or pierced), by the displaceable component 10 in the event of a collision, the fuel line assembly 100 further comprises an impact structure 130.

The impact structure 130 is arranged such that, if the displaceable component 10 is displaced towards the fuel line assembly 100, the displaceable component 10 will impact the impact structure 130 prior to impacting the fuel lines 110.

As shown in FIGS. 1 and 2, the impact structure 130 may be coupled to the fuel lines 110. In some arrangements, the impact structure 130 may be coupled to, or integrally formed with, the fuel line coupler 120. Alternatively, the impact structure 130 may be spaced apart from the fuel line coupler 120, (e.g. along the length of the fuel lines 110).

As shown, the impact structure 130 encompasses both the fuel feed line 112 and the fuel return line 114. Encompassing the fuel lines 110 further comprises where the impact structure 130 surrounds the fuel lines 110 around an entire circumference of each of the lines such that a displaceable component moving toward the fuel lines 110 from a direction of the x-axis or the y-axis will contact the impact structure 130 prior to contacting the fuel lines 110. In some examples, the impact structure 130 may completely block the displaceable component 10 from contacting the fuel lines 110. In other examples, the impact structure 130 may absorb a majority of a force of the displaceable component 10 such that a remaining force of the displaceable component is unable to degrade the fuel lines 110.

Turning now to FIGS. 3a, 3b, and 3c, the impact structure 130 comprises a housing configured to house a portion, (e.g. a part of the length), of the fuel lines 110.

The impact structure 130 may comprise a first housing part 132 and a second housing part 134 configured to couple together around one or more of the fuel lines 112, 114 in order to couple the impact structure 130 to the fuel lines 110. The first and second housing parts 132, 134 may comprise respective recesses 132a, 134a for receiving the fuel lines 110. More specifically, the first recess 132a of the first housing part 132 may receive the fuel return line 114 and the second recess 134a of the second housing part 134 may receive the fuel feed line 112.

The first and second housing parts 132, 134 may be coupled together by a hinge 136 of the impact structure 130. The hinge 136 allows the first and second housing parts 132, 134 to be moved, (e.g. pivoted), relative to one another, in order to position the housing parts around the fuel line.

As shown in FIG. 3b, the hinge 136 may comprise two or more hinge portions 136a spaced along respective edges of the first and second housing parts 132, 134. Alternatively, the hinge 136 may comprise a single hinge portion, e.g.

extending along substantially the complete length of the first and second housing part edges.

In the arrangement shown in FIGS. 3a, 3b, and 3c, the first and second housing parts 132, 134 are formed together as a one-piece component. For example, the first and second housing parts 132, 134 may comprise a one-piece molded component, such as an injection molded component. The first and second housing parts may be formed from a plastic material.

The hinge 136 may be a living hinge formed as part of the first and second housing parts 132, 134. However, in other arrangements, the first and second housing parts 132, 134 may be separate components and the hinge 136 may be formed by hinge portions of the first and second housing parts that are pivotally coupleable. In such cases, the hinge may further comprise a pin.

The hinge 136 may be provided on a first side of an interface between the first and second housing parts 132, 134, and the first and second housing parts may further comprise one or more respective coupling portions 132b, 134b for coupling the first and second housing parts 132, 134 together on a second side of their interface.

As depicted in FIGS. 3a, 3b, and 3c, the coupling portions 132b formed on the first housing part 132 comprise male clip portions and the coupling portions 134b formed on the second housing portion 134 comprise female clip portions configured to receive the male clip portions 132b to couple the first and second housing portions together. However, in other arrangements, different arrangements of the clip portions may be provided. For example, male clip portions may be provided on the second housing part 134 and female clip portions may be provided on the first housing part 132 or a combination of male and female clip portions may be provided on both parts.

Additionally or alternatively, any other features for coupling together the first and second housing parts 132, 134 may be used. The coupling features may be integrally formed with the first and second housing parts 132, 134, or may be separate from the first and second housing parts. For example, a separate clip part may be provided to couple the first and second housing parts 132, 134 together, (e.g. along the second side of the interface between them).

As depicted in FIGS. 3a, 3b, and 3c, the impact structure 130 may comprise a third housing part 135 for housing a portion of another of the fuel lines 110. The third housing part 135 may be similar to the second housing part 134 described above. The features described above in relation to the second housing part 134 and the connection between the first and second housing parts 132, 134 may apply equally to the third housing part 135 and the connection between the first and third housing parts.

The third housing part 135 may be formed integrally with the first and second housing parts 132, 134, e.g. as a one piece molded component. The third housing part 135 may be hingedly connected to the first housing part 132 by a living hinge 137, in the same way as the second housing part 134. As shown in FIGS. 3a, 3b, and 3c, the living hinge 137 between the first and third housing parts 132, 135 may be arranged on an opposite side of the first housing part 132 to the hinge 136 between the first and second housing parts 132, 134.

The third housing part 135 may comprise a recess 135a for receiving the other of the fuel lines 110, which corresponds to one of the recesses 132a formed on the first housing portion 132, so that the other of the fuel lines can be received between the first and third housing parts 132, 135, such that a portion of the other of the fuel lines is housed within the impact structure 130. For example, in one arrangement, the fuel feed line 112 may be housed between the first and second housing parts 132, 134, and the fuel return line 114 may be housed between the first and third housing parts 132, 135, or vice versa. A combination of the first, second, and third housing parts 132, 134, and 135, respectively, may comprise a heart shape. However, the heart shape may be asymmetric as shown in FIG. 3a.

The third housing part 135 may comprise one or more coupling portions 135b, e.g. female clip portions, similar to the coupling portions 134b formed on the second housing part. The first housing part 132 may comprise one or more further coupling portions 132c, (e.g. further male clip portions), configured to couple with the coupling portions 135a of the third housing part 135.

By housing the fuel lines 110 within the first, second and third housing parts 132, 134, 135, the impact structure 130 protects the fuel lines 110 from being degraded (e.g., pierced and/or crushed) by the displaceable component 10 in the event of a collision. The impact structure 130 may be arranged at a location in which the displaceable component 10 is expected to impact the fuel line assembly 100 if it becomes displaced during a collision.

The impact structure 130 comprises one or more impact faces 138, which are arranged such that, when the impact structure 130 is coupled to the fuel lines 110, if the displaceable component 10 is displaced towards the fuel line assembly 100, the displaceable component 10 will impact the impact faces 138, (e.g. prior to impacting the fuel lines).

The impact faces 138 may be provided on an opposite side of the fuel lines 110 relative to the attachment plane P. As depicted in FIGS. 1 to 3c, the impact faces 138 are shaped on the first housing part 132. However, in other arrangements, impact faces may additionally or alternatively be formed on the second and/or third housing parts 134, 135.

The impact faces 138 are angled relative to the fuel line assembly 100, (e.g. relative to the attachment plane P, such that if the displaceable component 10 impacts one or more of the impact faces 138, the force of the impact acts to displace the fuel line assembly 100 away from the displaceable component 10 and out of the space between the displaceable component 10 and the body frame structure 4, (e.g. in a direction with a component perpendicular to the direction of displacement of the displaceable component 10).

The direction of displacement of the displaceable component 10 may be substantially parallel with the collision impact direction. Hence, the impact at one or more of the impact faces 138 may cause the fuel line assembly 100 to be displaced in a direction with a component perpendicular to the collision impact direction.

In the arrangement shown in FIGS. 1 and 2, the impact faces 138 are arranged such that the force of an impact at one or more of the impact faces 138 acts to displace the fuel line assembly 100 in a direction with a component parallel with the attachment plane P. In this way, the impact structure 130 may block the fuel lines 110 from being pierced and/or crushed during the collision (e.g. by the displaceable component 10).

As depicted in FIGS. 1 and 2, the one or more impact faces 138 are shaped to correspond to one or more faces of the displaceable component 10 that may impact the impact faces 138 in the case of a collision. In particular, the impact faces 138 comprise first and second impact faces 138a, 138b that are angled relative to one another so as to correspond to the shape of the displaceable component 10. In this way, the impact force may be transferred to the impact structure 130 over a greater area of the impact structure 130, reducing local distortions of the impact faces 138 in the case of an impact. Furthermore, providing the first and second impact faces 138a, 138b that are angled relative to one another may cause the overall impact force resulting from the impact of the displaceable component 10 at the first and second impact faces 138a, 138b to be in a desired direction for decoupling the fuel lines 110 from the body frame structure 4, as described below.

In some examples, the angle formed by the first and second impact faces is between 90 and 180 degrees. In some examples, the angle is between 100 and 180 degrees. In some examples, additionally or alternatively, the angle is between 100 and 170 degrees. In some examples, additionally or alternatively, the angle is between 110 and 160 degrees. In some examples, additionally or alternatively, the angle is between 120 and 160 degrees. In some examples, additionally or alternatively, the angle is between 130 and 150 degrees. In one example, the angle is exactly 135 degrees.

The impact structure 130 may comprise a shell structure having one or more stiffening features 140, such as ribs, webs and/or swages. The stiffening features may be arranged to stiffen one or more of the impact faces 138 and/or prevent distortion of the impact structure 130 in the event of an impact at one or more of the impact faces 138.

In the arrangement depicted in FIG. 3c, the stiffening features 140 of the impact structure 130 comprise a plurality of circular ribs 140a protruding inwardly from the first impact face 138a, (e.g. into the housing space defined by the first housing part 132). In one example, the circular ribs 140a may be dimples, recesses, and/or craters. The stiffening features 140 further comprise a plurality of webs 140b, extending from the first impact face 138a over side walls 133 of the first housing part 132. In other arrangements, ribs, (e.g. circular ribs), webs and/or other stiffening features may be formed on the second impact face 138b in addition to or as an alternative to the first impact face 138a. The plurality of webs 140b may be evenly spaced apart from one another. The plurality of webs 140b may be substantially rectangular, wherein the plurality of webs may extend across multiple faces of the impact structure. For example, the plurality of webs 140b extend between adjacent circular ribs 140a from the first impact face 138a and over the side walls 133. In one example, the plurality of webs 140b may protrude from the first impact face 138a and the side walls 133. A magnitude of the protruding of the plurality of webs 140b may be adjusted based on a system configuration. For example, the magnitude of the protruding may be increased if a number of circular ribs is decreased.

Figure 4:
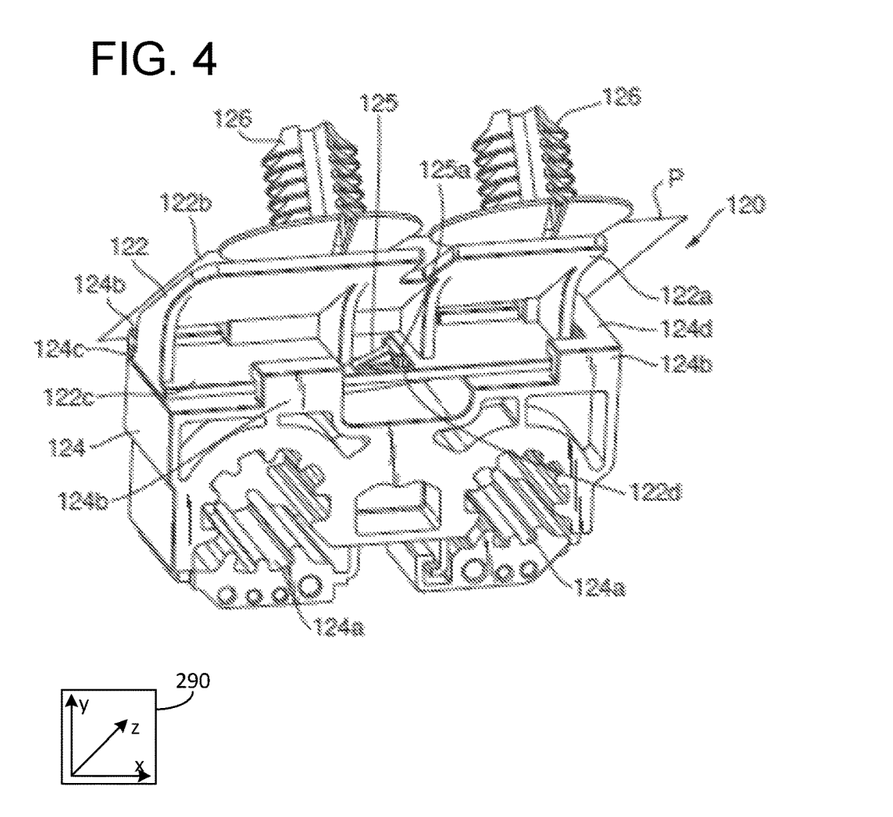
FIG. 4 is a front perspective view of a fuel line coupler, according to the present disclosure, in a first configuration prior to a collision.

With reference to FIG. 4, the fuel line coupler 120 comprises a fixed part 122 configured to couple, (e.g. fixedly couple), to the body frame structure 4 of the vehicle, and a movable part 124, moveably, (e.g. slidably), couplable to the fixed part 122. The movable part 124 comprises one or more fuel line coupling portions 124a couplable to the fuel lines 110.

The fixed part 122 comprises an attachment portion 122a. The fixed part 122 is configured to couple to the body frame structure 4 at the attachment portion 122a. For example, the attachment portion 122a may be configured to receive one or more fasteners, e.g. screws, for attaching the fixed part 122 to the body frame structure 4. Alternatively, the fixed part 122 may comprise one or more fasteners, such as button clips, e.g. fir-tree button clips or push-in rivets 126, formed integrally with the fixed part 122 for coupling the fixed part 122 to the body frame structure 4. In some embodiments, additionally or alternatively, the fixed part 122 may be configured to couple to the body frame structure 4 using other temporary or permanent fastening methods, such as rivets, brazing, welding, or using an adhesive.

The attachment portion 122a may define an attachment surface 122b that contacts, or aligns with, a corresponding surface of the body frame structure 4 when the fixed part 122 is coupled to the body frame structure 4. At least part of the attachment surface 122b may define the attachment plane P of the fuel line assembly 100. When the fixed part 122 is coupled to the body frame structure 4, the attachment surface 122b may be in contact, or aligned, with the corresponding surface of the body frame structure 4 in, or parallel with, the attachment plane P.

The fixed part 122 further comprises a coupling portion 122c configured to moveably, (e.g. slidably), couple with the movable part 124.

Figure 5:
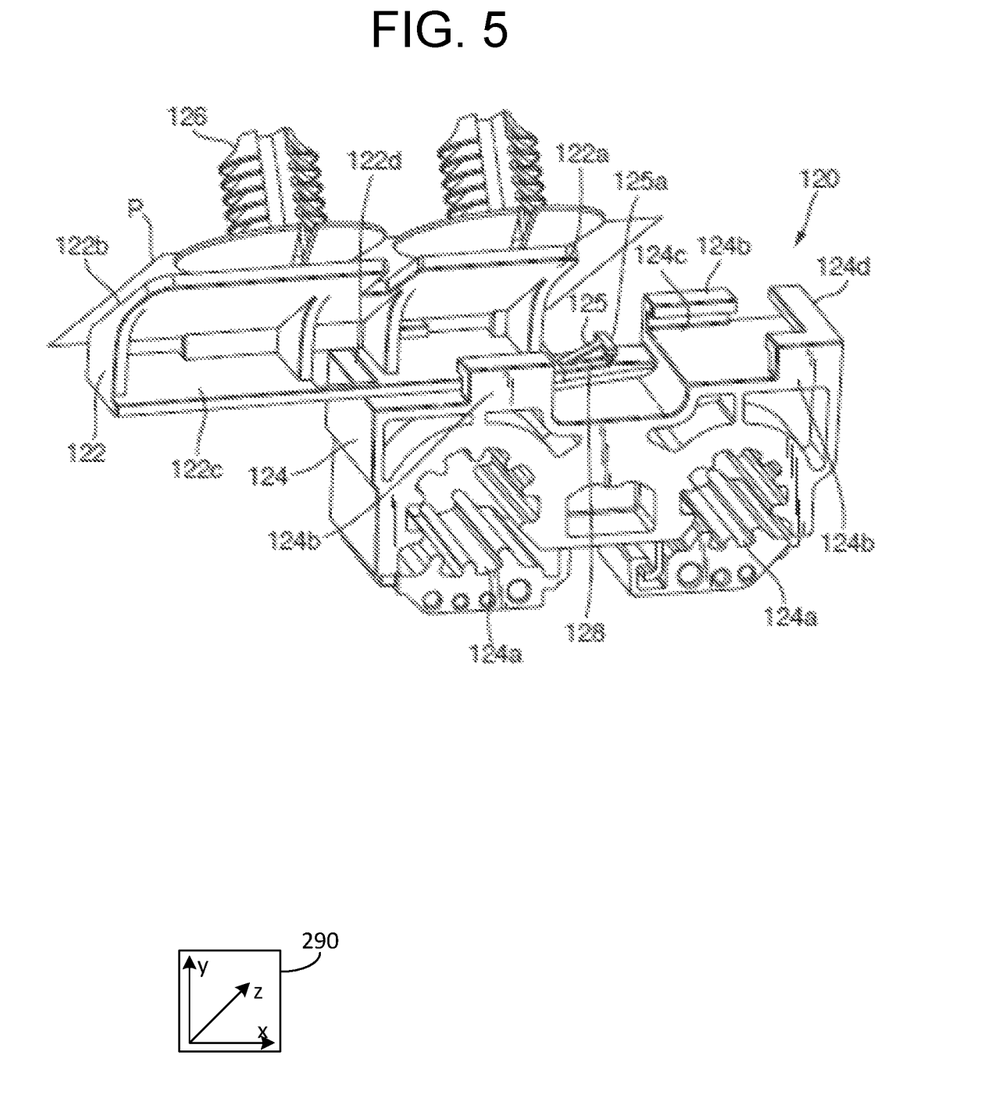
FIG. 5 is a front perspective view of a fuel line coupler, according to the present disclosure, in a second configuration following a collision.

As depicted in FIGS. 4 and 5, the movable part 124 comprises a plurality of protrusions 124b, which at least partially form a recess 124c for receiving, (e.g. slidably receiving), the coupling portion 122c of the fixed part 122.

As shown in FIG. 4, the recess 124c is arranged such that, when the fixed part 122 is coupled to the movable part 124, (e.g. when the coupling portion 122c is received within the recess 124c), the recess 124c extends in a direction parallel with the attachment plane P. The movable part can thereby be moved relative to the fixed part 122 in the direction parallel to the attachment plane P in order for the coupling portion 122 to be received within the recess 124c, wherein the moveable part may be moved by an amount equal to or less than the size of the recess 124c.

The coupling portion 122c of the fixed part 122 and the protrusions 124b of the movable part 124 thereby facilitate movement of the fuel lines 110 relative to the body frame structure 4 in the direction parallel to the attachment plane P in the event of a collision, as described above. Furthermore, movement of the movable part 124 relative to the fixed part 122 can lead to decoupling of the movable part 124 from the fixed part 122, e.g. when the coupling portion 122c is no longer received within the recess 124c, such that the fuel lines 110 become decoupled from the body frame structure 4.

The movable part 124 further comprises a stop element 125 configured to abut with a stop face 122d of the fixed part 122 when the movable part 124 is coupled to the fixed part 122. The stop element 125 resists relative movements of the fixed part 122 and the movable part 124 during normal operation of the motor vehicle (e.g., outside of a collision). Additionally, the stop element 125 and stop face 122d are arranged to resist movements of the movable part 124 relative to the fixed part 122 that would lead to the movable part 124 becoming decoupled from the fixed part 122. As such, the movable part 124 may not move during vehicle conditions outside of a collision as forces generated during normal operation of the vehicle are insufficient to overcome a resistance of the stop element 125 and the stop face 122d.

In the arrangement shown, the stop element 125 comprises a protrusion which extends through an opening formed in the coupling portion 122c, and the stop face 122d is an internal face of the opening. However, alternative arrangements are also envisaged.

The stop element 125 is configured such that the stop face 122d is able to move past the stop element 125 when a threshold force is applied to the stop element by the stop face, (e.g. so that the movable part 124 can move relative to the fixed part 122). For example, the stop element 125 may be formed on a resilient portion 128 of the movable part 124 and may comprise a ramped abutment face 125a against which the stop face 122d abuts. When the threshold force is applied to the ramped abutment face 125a, the resilient portion 128 may be deflected such that the stop face 122d is able to ride over the ramped abutment face 125a.

The threshold force may be equal to or less than the force applied (or expected to be applied) to the fuel line coupler 120 in the direction parallel to the attachment plane P when the displaceable component 10 impacts one or more of the impact faces 138 of the impact structure in the event of a collision. For example, the threshold force may be approximately 0.5 kN, such as 400N. The fuel line coupler 120 is thereby configured such that the moveable part 124 can become decoupled from the fixed part 122 due to the force applied to one or more of the impact faces 138 in the event of a collision. That is to say, a force applied in a y-z plane (e.g., the attachment plane P) may overcome the stop element 125 of the resilient portion 128 to allow the movable part 124 to move along the x-axis.

As depicted, one or more of the protrusions 124b may form an end face 124d of the recess 124c, which may prevent further movement of the movable part 124 relative to the fixed part 122 into the recess 124c, once the coupling portion 122c abuts the end face 124d.

As shown in FIGS. 1 and 2, when the movable part 124 is coupled to the fixed part 122 within the fuel line assembly, the movable part 124 is oriented such that the force applied on the impact structure 130 by the displaceable component 10 in the event of a collision acts to decouple the moveable part from the fixed part, e.g. by moving the coupling portion out of the recess 124c, e.g. away from the end face 124d.

The fuel line coupler 120 may be positioned and oriented within the engine compartment 6 such that motion of the fuel line assembly 100 is allowed by the fuel line coupler 120 in an outboard direction of the vehicle, e.g. away from the displaceable component 10, such that trapping of the fuel line coupler between the displaceable component and the body frame structure 4, or between other components of the vehicle, is blocked in the event of a collision.

For example, the movable part 124 may be arranged such that the end face 124d is arranged on an inboard side of the fuel line coupler 120.

In the arrangement described above, the coupling portion 122c is formed on the fixed part and the recess 124c is formed by the movable part 124. However, it is equally envisaged that the coupling portion 122c may be formed on the movable part 124 and the recess 124c formed on the fixed part 122.

Similarly, in other arrangements the stop element 125 may be formed on the fixed part 122 and the stop face 122d may be formed on the movable part 124.

In this way, the fuel line attachment assembly comprises a fixed portion and a movable portion. The fixed portion may be fixedly coupled to an engine body frame structure. A movable portion, which is shaped to receive a fuel return line and a fuel feed line, is coupled to the fixed portion. The coupling between the fixed portion and the movable portion may be adjusted during a vehicle collision, while the coupling may be maintained during all other vehicle conditions. The technical effect of allowing the movable portion to move during a vehicle collision is to move the fuel lines away from a displaceable engine component so that the fuel lines are not degraded during the collision.

In another representation, an embodiment of a fuel line attachment assembly for a motor vehicle comprises a fuel line coupler for coupling a fuel line to a frame of the vehicle in an attachment plane, an impact structure, wherein the impact structure comprises an impact face, the impact face being angled relative to the attachment plane, such that an impact on the impact face acts to displace the fuel line in a direction with a component parallel to the attachment plane.

A first example of the fuel line attachment assembly further comprises where the impact structure comprises a housing configured to house at least a portion of the fuel line within the impact structure.

A second example of the fuel line attachment assembly, optionally including the first example, further includes where the impact structure comprises a shell structure having one or more stiffening features arranged to stiffen the impact face.

A third example of the fuel line attachment assembly, optionally including any of the previous examples, further includes where the impact structure comprises a first portion and a second portion, wherein the first and second portions are configured to couple together about the fuel line in order to couple the impact structure to the fuel line.

A fourth example of the fuel line attachment assembly, optionally including any of the previous examples, further includes where the first and second portions of the impact structure are coupled together by a living hinge.

A fifth example of the fuel line attachment assembly, optionally including any of the previous examples, further includes where the impact structure is a one-piece plastics component.

A sixth example of the fuel line attachment assembly, optionally including any of the previous examples, further includes where the fuel line coupler is configured to decouple the fuel line from the vehicle frame by virtue of the displacement of the fuel line in the direction with a component parallel to the attachment plane.

A seventh example of the fuel line attachment assembly, optionally including any of the previous examples, further includes where the fuel line coupler comprises a fixed part configured to be fixedly coupled to the vehicle frame, and a movable part configured to couple to a fuel line and movably couple to the fixed part.

An eighth example of the fuel line attachment assembly, optionally including any of the previous examples, further includes where the movable part is movable relative to the fixed part in the direction with a component parallel to the connection plane.

A ninth example of the fuel line attachment assembly, optionally including any of the previous examples, further includes where one of the fixed part and the movable part comprises a recess configured to slidably receive a portion of the other of the fixed part and the movable part.

A tenth example of the fuel line attachment assembly, optionally including any of the previous examples, further includes where the fuel line coupler comprises a stop element configured to resist displacement of the fuel lines in the direction parallel to the attachment plane until a threshold displacement force is applied to the fuel line attachment assembly.

An eleventh example of the fuel line attachment assembly, optionally including any of the previous examples, further includes where the stop element is arranged to resist movement of the movable part relative to the fixed part.

An embodiment of a fuel line coupler for coupling a fuel line to a frame of a motor vehicle comprises a fixed part configured to fixedly couple to the vehicle frame in an attachment plane and a movable part configured to couple to the fuel line and movably couple to the fixed part, such that the movable part is movable relative to the fixed part in a direction parallel with the attachment plane.

A first example of the fuel line coupler further includes where the fuel line coupler is configured to decouple the fuel line from the vehicle frame by virtue of the movement of the fuel line in the direction with a component parallel to the connection plane.

A second example of the fuel line coupler, optionally including the first example, further includes where one of the fixed part and the movable part comprises a recess configured to slidably receive a portion of the other of the fixed part and the movable part.

A third example of the fuel line coupler, optionally including any of the previous examples, further includes where the fuel line coupler comprises a stop element configured to resist displacement of the fuel lines in the direction parallel to the attachment plane until a threshold displacement force is applied to the fuel line attachment assembly.

A fourth example of the fuel line coupler, optionally including any of the previous examples, further includes where the stop element is arranged to resist movement of the movable part relative to the fixed part.

A fifth example of the fuel line coupler, optionally including any of the previous examples, further includes where a motor vehicle comprises the fuel line coupler and further comprises a vehicle component, the vehicle component being displaceable in direction towards the impact surface during a collision of the motor vehicle, wherein the impact surface is shaped to at least partially conform to a surface of the vehicle component.

An embodiment of a system comprises a fuel line attachment assembly comprising a fixed portion fixedly coupled to a frame of a vehicle, further comprising a movable portion coupled to the fixed portion via a stop element, the movable portion slides along a recess of the fixed portion in response to a threshold force applied to the stop element.

A first example of the system further comprises where a fuel feed line and a fuel return line extend through the movable portion.

A second example of the system, optionally including the first example, further comprises where an impact structure in face-sharing contact with a face of the moveable portion opposite the fixed portion, wherein the fuel feed line and the fuel return line extend through openings of the impact structure.

A third example of the system, optionally including any of the previous examples, further comprises where the impact structure comprises a first portion coupled to each of a second portion and a third portion, and where the fuel feed line extends through an opening formed between the second portion and the first portion, and where the fuel return line extends through an opening formed between the third portion and the first portion.

A fourth example of the system, optionally including any of the previous examples, further comprises where the second portion and the third portion are pivotable.

A fifth example of the system, optionally including any of the previous examples, further comprises where the impact structure comprises stiffening features including a plurality of circular ribs and a plurality of webs.

A sixth example of the system, optionally including any of the previous examples, further comprises where the plurality of circular ribs protrudes into the impact structure toward the fuel feed line and the fuel return line.

A seventh example of the system, optionally including any of the previous examples, further comprises where the plurality of webs extends from an angled impact face to a side face, wherein the side face is opposite a face of the impact structure in contact with the movable portion, wherein the plurality of webs comprises a rectangular shape.

An eighth example of the system, optionally including any of the previous examples, further comprises where the angled impact face is angled relative to a direction of movement of the movable portion.

A fuel line attachment assembly, comprises a fuel line coupler comprising a fixed portion fixedly coupled to a frame of a vehicle along an attachment plane, wherein the fuel line coupler further comprises a movable portion slidably coupled to the fixed portion along a recess of the fixed portion, wherein the movable portion selectively slides based on a force applied to a stop element arranged in the fixed portion and an impact structure comprising an impact face angled relative to the attachment plane, wherein the impact face displaces a fuel line extending through each of the movable portion and the impact structure in a direction with a displaceable component parallel to the attachment plane.

A first example of the fuel line attachment assembly further comprises where the impact structure is a single-piece.

A second example of the fuel line attachment assembly, optionally including the first example, further comprise where the fuel line coupler decouples the fuel line from the frame of the vehicle when the movable portion slides along the recess in the direction parallel to the attachment plane.

A third example of the fuel line attachment assembly, optionally including any of the previous examples, further comprises where the stop element comprises a protrusion.

A fourth example of the fuel line attachment assembly, optionally including any of the previous examples, further comprises where the stop element comprises a lever-shape, and where the stop element is actuated in a direction angled to the direction parallel to the attachment plane in response to the force being greater than or equal to a threshold force.

A fifth example of the fuel line attachment assembly, optionally including any of the previous examples, further comprises where the threshold force corresponds to a force of a vehicle collision.

A sixth example of the fuel line attachment assembly, optionally including any of the previous examples, further comprises where the angled face is a first angled face, the impact structure further comprising a second angled face adjacent to the first angled face, and where each of the first angled face and the second angled face are angled relative to the attachment plane.

A vehicle fuel line attachment assembly, comprising a fuel line coupler comprising a fixed portion fixedly coupled to a frame of a vehicle along an attachment plane, wherein the fuel line coupler further comprises a movable portion slidably coupled to the fixed portion along a recess of the fixed portion, wherein the movable portion selectively slides based on a force applied to a stop element arranged in the fixed portion and an impact structure comprising an impact face angled relative to the attachment plane, wherein the impact face displaces a fuel line extending through each of the movable portion and the impact structure in a direction with a displaceable component parallel to the attachment plane, wherein the impact structure further comprises stiffening features including a plurality of circular ribs and a plurality of webs extending from the impact face to a side opposite the movable portion.

A first example of the vehicle fuel line attachment assembly further comprises where the fuel line decouples from the frame in response to the movable portion sliding along the recess during a vehicle collision.

A second example of the vehicle fuel line attachment assembly, optionally including the first example, further comprises where the moveable portion comprises a ramped abutment face that is in face sharing contact with the stop element.

A third example of the vehicle fuel line attachment assembly, optionally including any of the previous examples, further comprises where the moveable portion and the impact structure house at least a portion of a fuel return line and a fuel feed line.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a fuel line attachment assembly comprising a fixed portion fixedly coupled to a frame of a vehicle, further comprising a movable portion coupled to the fixed portion via a stop element, the movable portion slides along a recess of the fixed portion in response to a threshold force applied to the stop element.

2. The system of claim 1, further comprising where a fuel feed line and a fuel return line extend through the movable portion.

3. The system of claim 2, further comprising an impact structure in face-sharing contact with a face of the moveable portion opposite the fixed portion, wherein the fuel feed line and the fuel return line extend through openings of the impact structure.

4. The system of claim 3, wherein the impact structure comprises a first portion coupled to each of a second portion and a third portion, and where the fuel feed line extends through an opening formed between the second portion and the first portion, and where the fuel return line extends through an opening formed between the third portion and the first portion.

5. The system of claim 4, wherein the second portion and the third portion are pivotable.

6. The system of claim 3, wherein the impact structure comprises stiffening features including a plurality of circular ribs and a plurality of webs.

7. The system of claim 6, wherein the plurality of circular ribs protrudes into the impact structure toward the fuel feed line and the fuel return line.

8. The system of claim 6, wherein the plurality of webs extends from an angled impact face to a side face, wherein the side face is opposite a face of the impact structure in contact with the movable portion, wherein the plurality of webs comprises a rectangular shape.

9. The system of claim 8, wherein the angled impact face is angled relative to a direction of movement of the movable portion.

10. A fuel line attachment assembly, comprising:
a fuel line coupler comprising a fixed portion fixedly coupled to a frame of a vehicle along an attachment plane, wherein the fuel line coupler further comprises a movable portion slidably coupled to the fixed portion along a recess of the fixed portion, wherein the movable portion selectively slides based on a force applied to a stop element arranged in the fixed portion; and
an impact structure comprising an impact face angled relative to the attachment plane, wherein the impact face displaces a fuel line extending through each of the movable portion and the impact structure in a direction with a displaceable component parallel to the attachment plane.

11. The fuel line attachment assembly of claim 10, wherein the impact structure is a single-piece.

12. The fuel line attachment assembly of claim 10, wherein the fuel line coupler decouples the fuel line from the frame of the vehicle when the movable portion slides along the recess in the direction parallel to the attachment plane.

13. The fuel line attachment assembly of claim 10, wherein the stop element comprises a protrusion.

14. The fuel line attachment assembly of claim 10, wherein the stop element comprises a lever-shape, and where the stop element is actuated in a direction angled to the direction parallel to the attachment plane in response to the force being greater than or equal to a threshold force.

15. The fuel line attachment assembly of claim 14, wherein the threshold force corresponds to a force of a vehicle collision.

16. The fuel line attachment assembly of claim 10, wherein the angled face is a first angled face, the impact structure further comprising a second angled face adjacent to the first angled face, and where each of the first angled face and the second angled face are angled relative to the attachment plane.

17. A vehicle fuel line attachment assembly, comprising:
a fuel line coupler comprising a fixed portion fixedly coupled to a frame of a vehicle along an attachment plane, wherein the fuel line coupler further comprises a movable portion slidably coupled to the fixed portion along a recess of the fixed portion, wherein the movable portion selectively slides based on a force applied to a stop element arranged in the fixed portion; and
an impact structure comprising an impact face angled relative to the attachment plane, wherein the impact face displaces a fuel line extending through each of the movable portion and the impact structure in a direction with a displaceable component parallel to the attachment plane, wherein the impact structure further comprises stiffening features including a plurality of circular ribs and a plurality of webs extending from the impact face to a side opposite the movable portion.

18. The vehicle fuel line attachment assembly of claim 17, wherein the fuel line decouples from the frame in response to the movable portion sliding along the recess during a vehicle collision.

19. The vehicle fuel line attachment assembly of claim 17, wherein the moveable portion comprises a ramped abutment face that is in face sharing contact with the stop element.

20. The vehicle fuel line attachment assembly of claim 17, wherein the moveable portion and the impact structure house at least a portion of a fuel return line and a fuel feed line.

\* \* \* \* \*